United States Patent [19]

August, Jr. et al.

[11] Patent Number: 5,278,860
[45] Date of Patent: Jan. 11, 1994

[54] MODULAR CONSTRUCTION OF FACE-PUMPED LASER HEAD COMPONENTS

[75] Inventors: John L. August, Jr., Schenectady; Mark J. Kukla, Ballston Spa, both of N.Y.; Todd J. Rockstroh, Maineville, Ohio; Nobuaki Iehisa, Mishima, Japan

[73] Assignee: General Electric Company, Schenectady, N.Y.

[21] Appl. No.: 952,087

[22] Filed: Sep. 28, 1992

[51] Int. Cl.⁵ .............................................. H01S 3/093
[52] U.S. Cl. ...................................... 372/70; 372/66; 372/69; 372/92; 372/107; 372/108; 372/109
[58] Field of Search ...................... 372/39, 40, 41, 66, 372/69, 70, 91, 107, 108, 109, 72, 35, 92

[56] References Cited

U.S. PATENT DOCUMENTS

| | | | |
|---|---|---|---|
| 4,378,601 | 3/1983 | Eggleston, III et al. | 372/35 X |
| 4,563,763 | 1/1986 | Kuhn | 372/66 X |
| 4,653,061 | 3/1987 | Fukae | 372/107 X |
| 4,972,426 | 11/1990 | Steffen | 372/35 |
| 5,012,481 | 4/1991 | Casteleiro | 372/92 X |

*Primary Examiner*—Brian Healy
*Attorney, Agent, or Firm*—Paul R. Webb, II

[57] ABSTRACT

This invention relates to face-pumped slab lasers of the type that have laser head assemblies constructed of individual components, which are rigidly attached together, in order to form an integral structure. Such structures of this type, generally, allow a face-pumped slab laser component to be assembled and disassembled easily and quickly.

7 Claims, 12 Drawing Sheets fig. 1 fig. 2 fig. 3 fig. 4 fig. 5 fig. 6 fig. 7 fig. 8 fig. 9 fig. 10 fig. 11 fig. 12

MODULAR CONSTRUCTION OF FACE-PUMPED LASER HEAD COMPONENTS

BACKGROUND OF THE INVENTION

1. Field of the Invention

This invention relates to face-pumped slab lasers of the type that have laser head assemblies constructed of individual components, which are rigidly attached together, in order to form an integral structure. Such structures of this type, generally, allow a face-pumped slab laser component to be assembled and disassembled easily and quickly.

2. Description of the Related Art

Up to the present invention, complete dismantling of a face-pumped slab laser head is required in order to repair, replace or service a face-pumped laser. The complete dismantling typically requires a total optical alignment to properly restore the laser performance. A typical "down time" for a face-pumped slab laser which usually involves complete dismantling, re-assembly and realignment is about two days. Obviously, such a lengthy "down time" is expensive and time consuming. Therefore, a new advantageous system, therefore, would be presented if such amounts of "down time" could be reduced.

It is known, in commercial rod lasers, to utilize a rod, an end cap, and a flow tube replacement assembly to reduce "down time". While this replacement assembly performs adequately for a rod laser, a face-pumped slab laser requires a far more complex replacement or modular assembly, such as, for example, the cooling integration and cooling passage design. Also, the optical alignment requirements of a rod laser are not as stringent as those of a face-pumped slab laser. Therefore, modular slab laser assembly which reduced "down time" would be advantageous.

It is apparent from the above that there exists a need in the art for a laser system which has a modular construction to reduce "down time", and which at least equals the safety and performance characteristics of other known lasers, but which at the same time is capable of being used with a face-pumped slab laser. It is a purpose of this invention to fulfill this and other needs in the art in a manner more apparent to the skilled artisan once given the following disclosure.

SUMMARY OF THE INVENTION

Generally speaking, this invention fulfills these needs by providing a face-pumped slab laser head, comprising a lamp means, at least two guide means operatively connected to said lamp means, a removable modular slab assembly substantially located adjacent to said lamp means and slidably engaging said guide means wherein said modular slab assembly is further comprising a face-pumped laser slab means and a holding means for holding said slab means in a predetermined orientation and a reflector containment means which substantially encloses said lamp means, said guide means and said removable modular slab assembly.

In certain preferred embodiments, the reflector means include upper and lower reflector halves. Also, the laser slab means includes a slab located within a glass tube. Finally, the holding means includes at least two outer end caps, at least two inner end caps and gaskets.

In another further preferred embodiment, the modular slab assembly can be easily removed and installed in the face-pumped slab laser system without adversely affecting the "down time" of the laser system.

The preferred face-pumped slab laser head, according to this invention, offers the following advantages: quick assembly, disassembly and reassembly of the modular components; reduced down time; good stability; good durability; maintains slab and optical alignment; and good economy. In fact, in many of the preferred embodiments, these factors of assembly, disassembly and reassembly, reduced down time, and slab and optical alignment are optimized to an extent that is considerably higher than heretofore achieved in prior, known laser systems.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Figure 1:
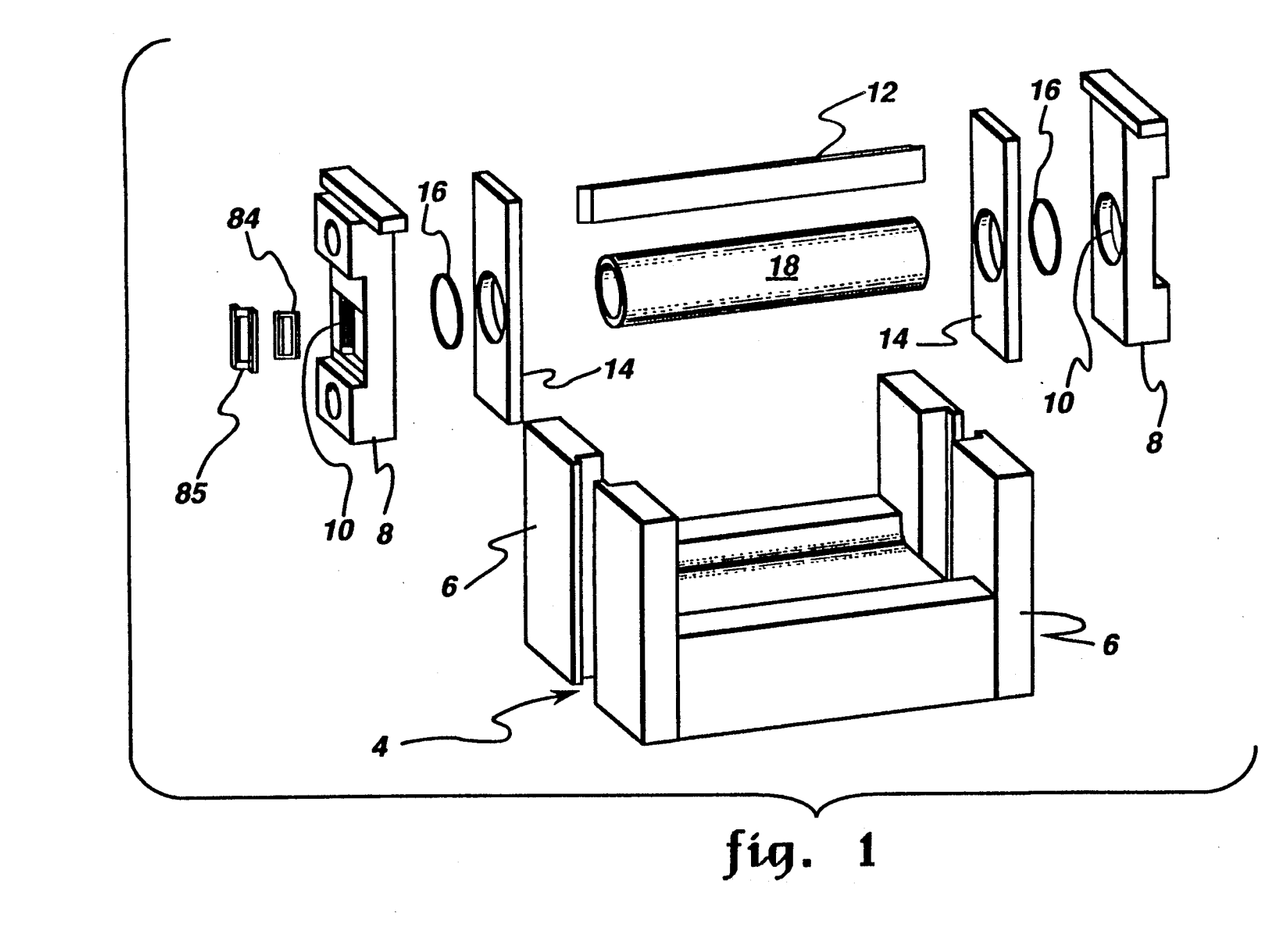
FIG. 1 is an exploded view of the component parts of a modular face-pumped slab laser, according to the present invention.

With reference first to FIG. 1, there is illustrated some of the component parts of modular face-pumped slab laser head 2. Head 2 includes, in part, lower reflector half 4, guide posts 6, outer end cap 8 having slab alignment slot 10, slab 12, inner end cap 14, gaskets 16, slab tube 18, slab seal gasket 84, slab seal retainer 85. Reflector half 4 and guide posts 6, preferably, are constructed of aluminum which are then coated by conventional coating techniques with gold. End caps 8, preferably, are constructed of brass which are then coated by conventional coating techniques with gold. Slab 12, preferably, is constructed of any suitable solid state lasing material such as Nd:YAG. Inner end cap 14, preferably, is constructed of copper which is then coated by conventional coating techniques with gold. Gaskets 16, preferably, are constructed of any suitable elastomeric material. Slab tube 18, preferably, is constructed of any suitable heat-resistant transparent material, such as glass.

Figure 2:
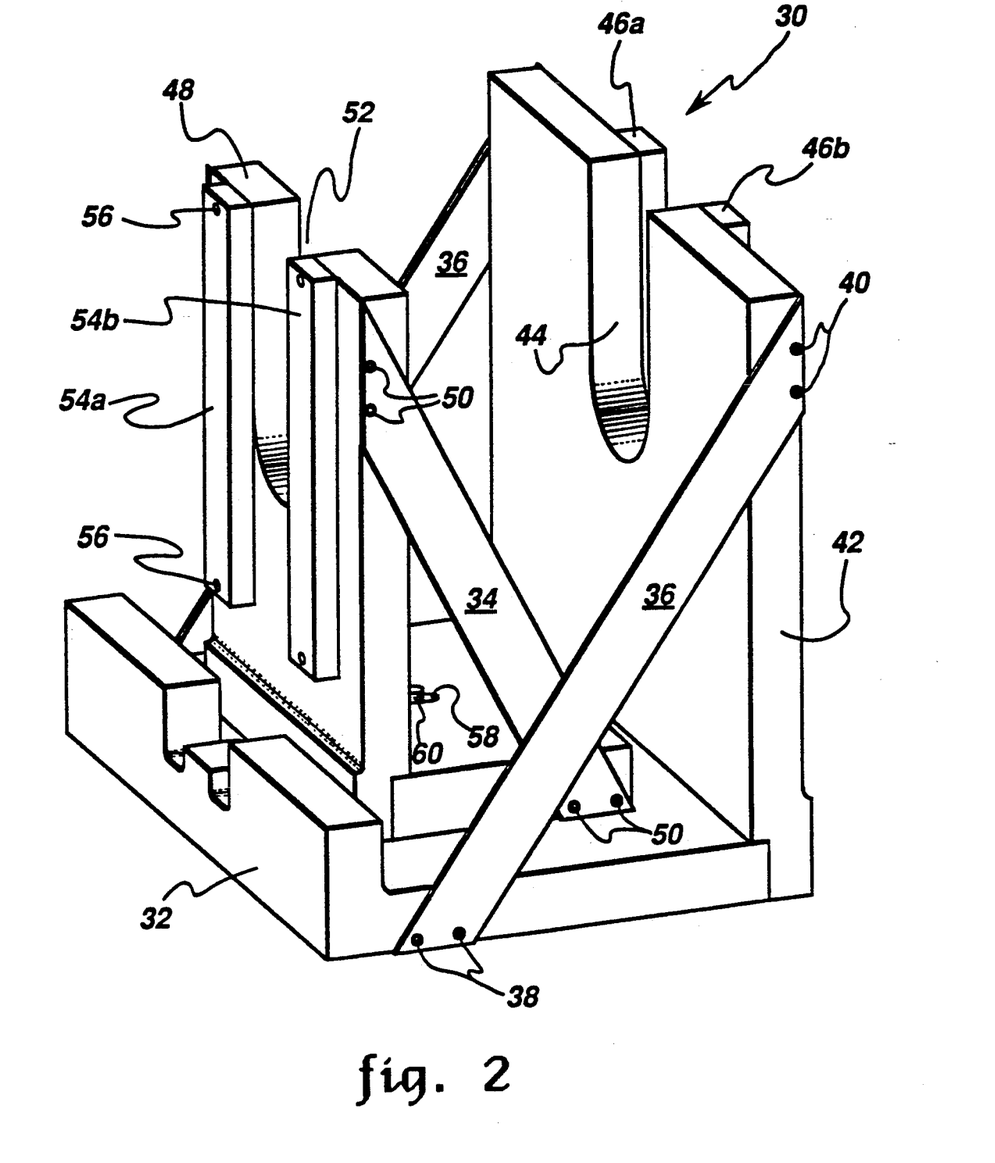
FIG. 2 is a schematic view of an alignment assembly jig, according to the present invention.

With respect to FIG. 2, there is illustrated jig assembly 30 for constructing modular face-pumped slab laser head 2. Jig assembly 30 includes, in part, bottom plate 32, supports 34 and 36, and end plates 42 and 48. Plates 32, 42 and 48 and supports 34 and 36, preferably, are constructed of aluminum. Bottom plate 32 is rigidly attached end plate 42 by conventional fasteners (not shown). Support 34 is rigidly attached to end plate 48 by conventional fasteners 50. Supports 36 are rigidly attached to bottom plate 32 by conventional fasteners 38. Support 36 is also rigidly attached to end plate 42 by conventional fasteners 40.

Located on top of end plate 42 are alignment blocks 46a and 46b. Blocks 46a and 46b, preferably, are constructed of aluminum and are rigidly attached to end plate 42 by conventional fasteners (not shown). Slot 44, which is machined in end plate 42 by conventional machining techniques, is located on the upper half of end plate 42. Block 46a is, preferably, precisely aligned by conventional techniques, pinned by conventional pins (not shown) and fastened to plate 42 by conventional fasteners (not shown). Block 46b is then rigidly attached to plate 42 by conventional fasteners (not shown).

End plate 48 is rigidly attached to bottom plate 32 by a conventional fastener 60. Fastener 60 is located in slot 58 in end plate 48. Slot 58 is machined into end plate 48 by conventional machining techniques. Located on top of end plate 48 are alignment blocks 54a and 54b. Blocks 54a and 54b, preferably, are constructed of aluminum and are rigidly attached to end plate 48 by conventional fasteners 56. Block 54a is, preferably, precisely aligned by conventional techniques, pinned by conventional pins (not shown) and fastened to plate 48 by conventional fasteners (not shown). Block 54b is then rigidly attached to plate 48 by conventional fasteners (not shown). Slot 52 is machined into the upper half of end plate 48 by conventional machining techniques.

Figure 3:
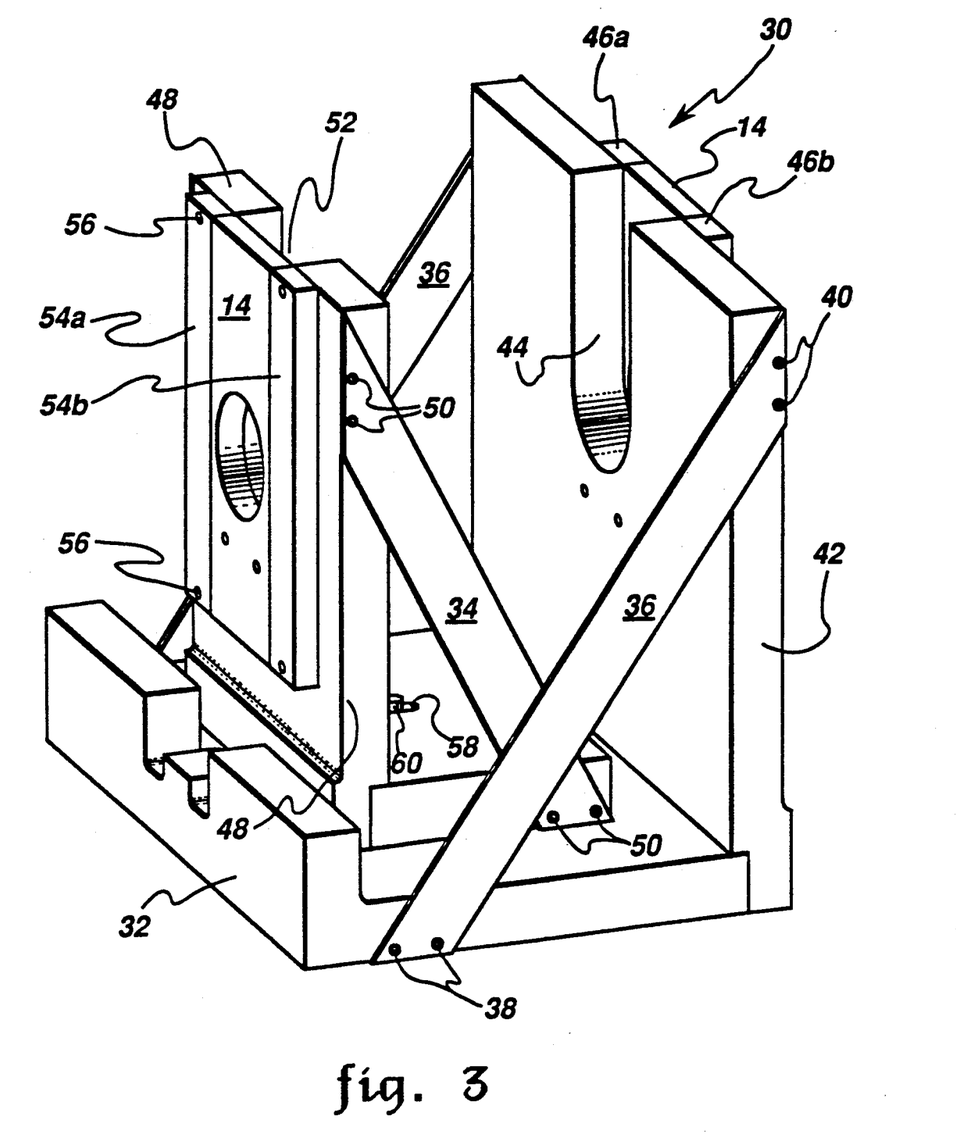
FIG. 3 is a isometric view of the assembly jig with the inner end caps in place.

FIG. 3 shows inner end caps 14 located on jig assembly 30. In particular, inner end caps 14 are located on end plates 42 and 48. Inner end caps 14 are rigidly retained on end plates 42 and 48 by conventional fasteners 61. As can be seen, inner end caps 14 are located on end plate 42 between alignment blocks 46 and on end plate 48 between alignment blocks 54.

Figure 4:
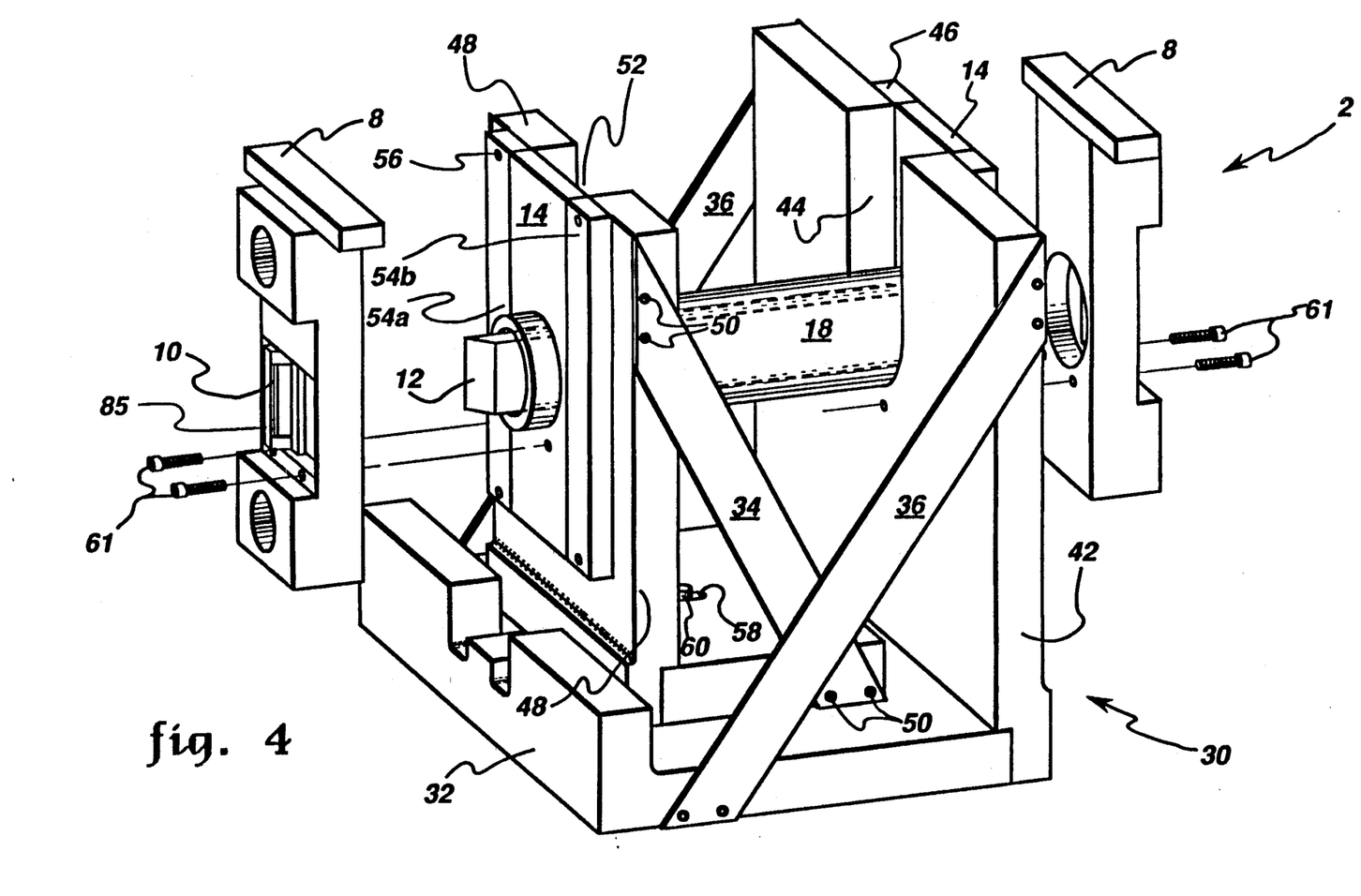
FIG. 4 is an isometric view of the assembly jig with the slab flow tube, gaskets and outer end caps in place.

FIG. 4 shows outer end cap 8 with alignment slot 10 just prior to insertion into slab 12. In particular, slab 12 is placed within slab tube 18 (FIG. 1). Gaskets 16 (FIG. 1 and FIG. 9) are then placed around tube 18. Tube 18 is then placed within jig assembly 30 such that slab 12 fits in alignment holes 10 of outer end caps 8. Outer end caps 8 are then fastened to inner caps 14 by conventional fasteners 62. Retainer 85 and seal 84 are placed around slab 12.

Figure 5:
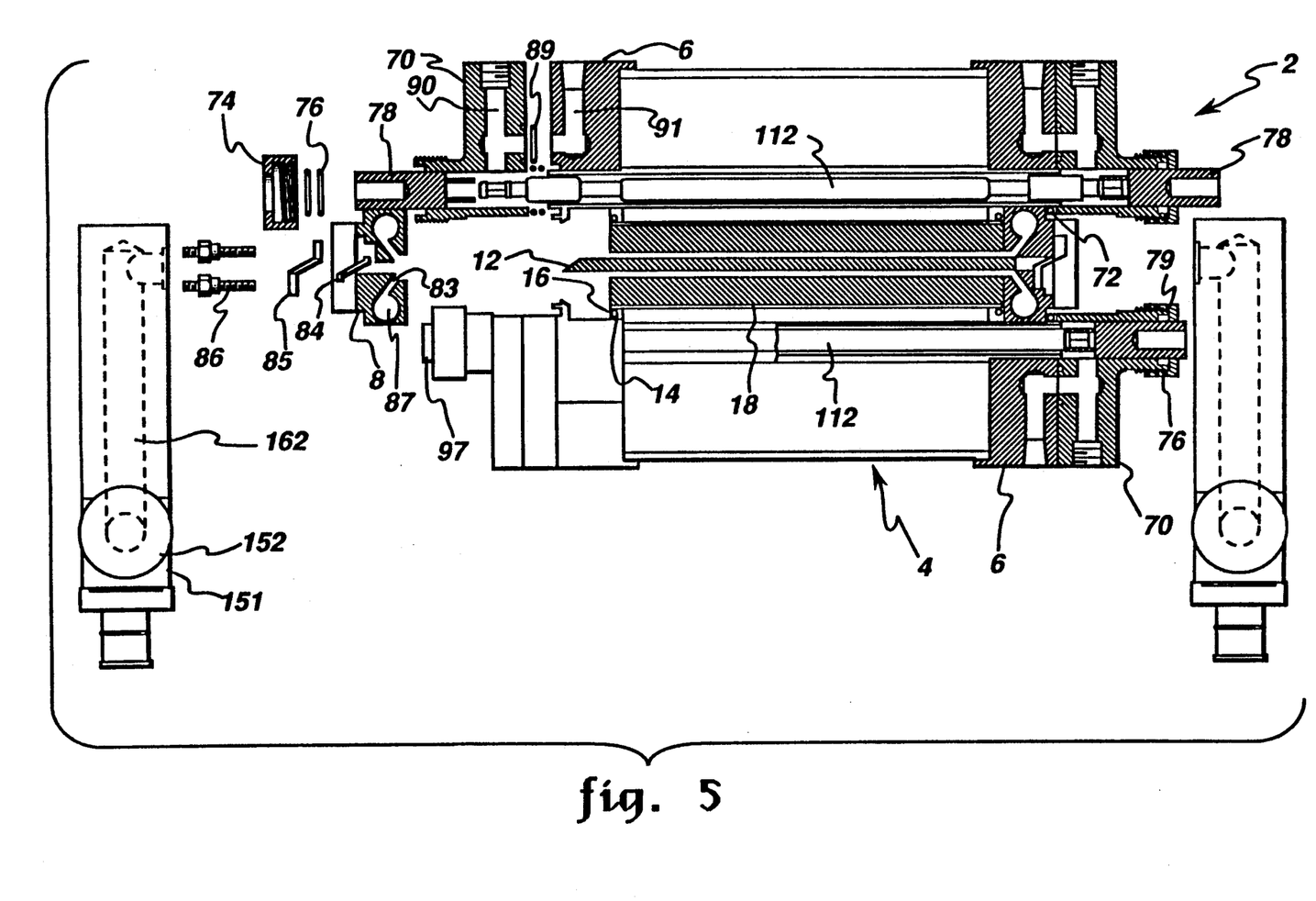
FIG. 5 is an exploded, top view of the modular face-pumped laser head, according to the present invention.
Figure 9:
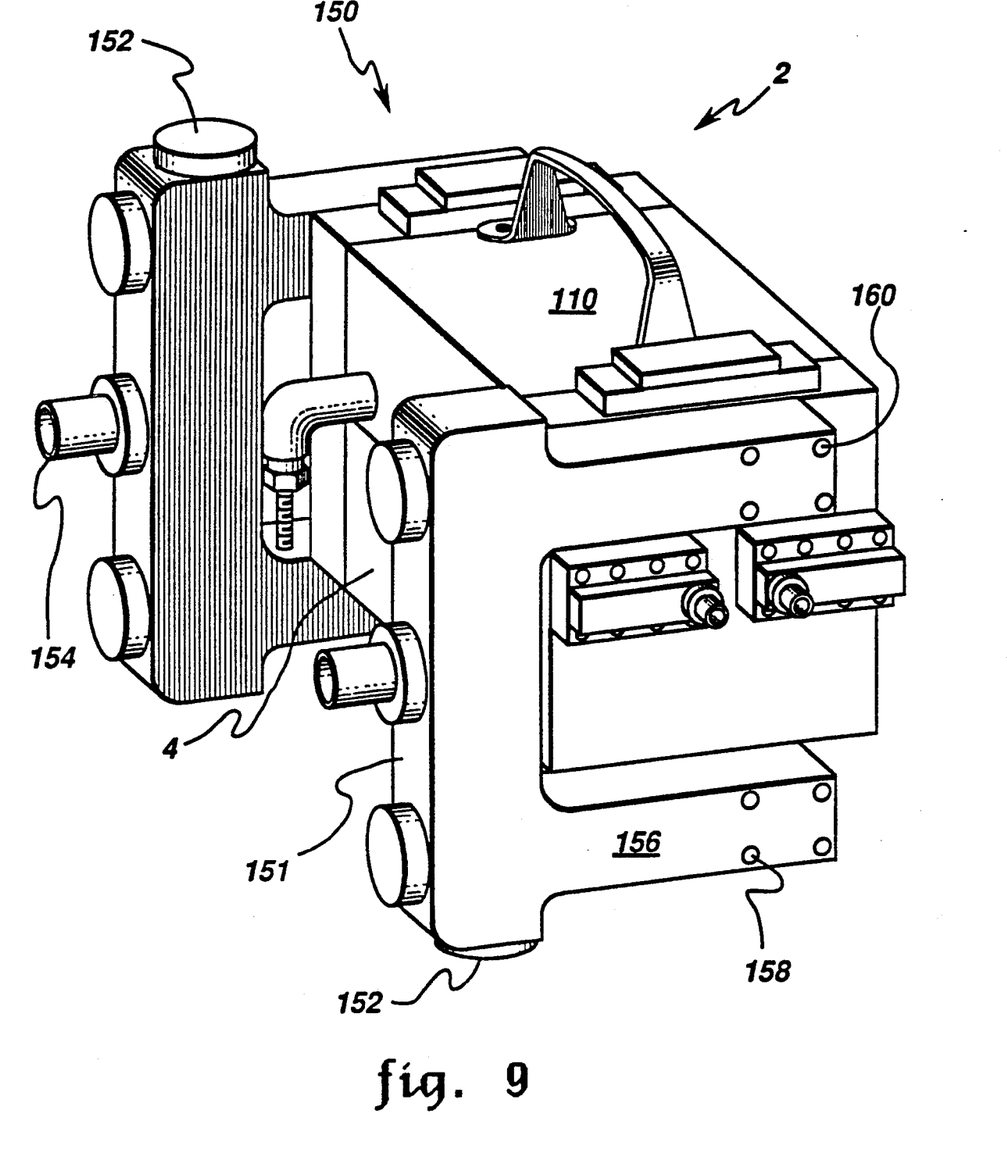
FIG. 9 is an isometric view of the modular face-pumped slab laser head completely assembled with the upper reflector half installed.
Figure 12:
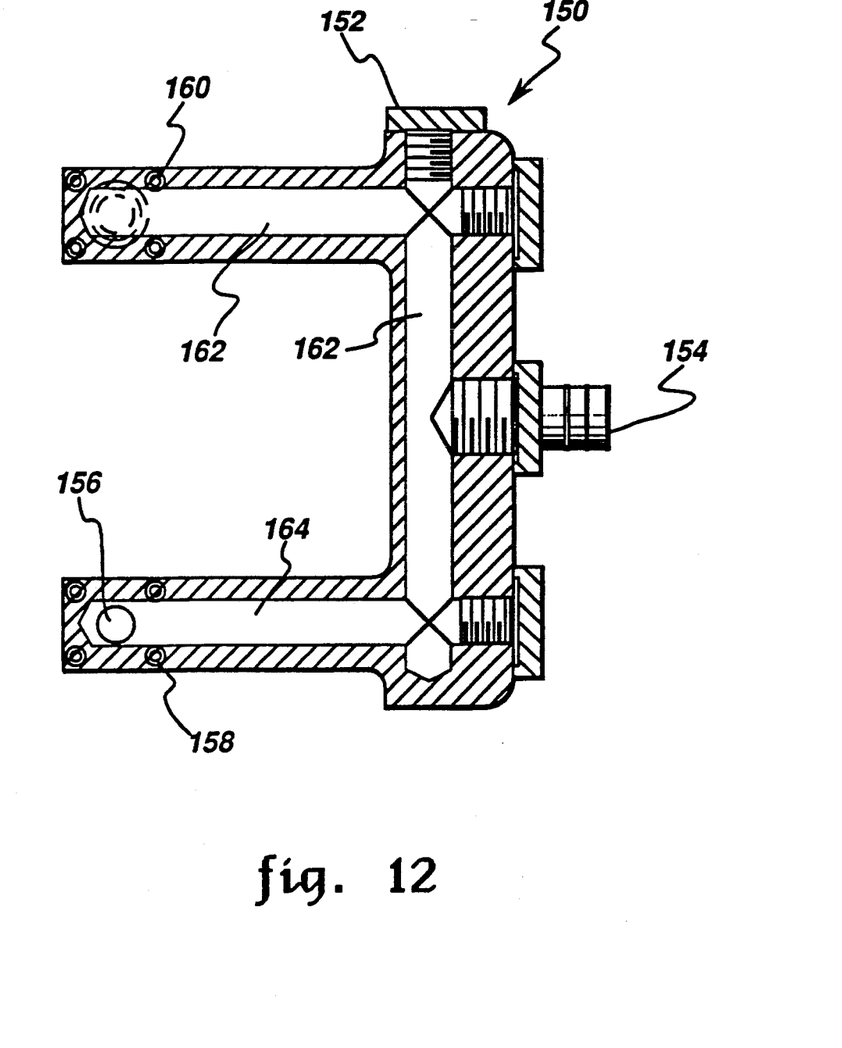
FIG. 12 is an end view of a self-draining coolant manifold for a modular slab laser assembly, according to the present invention.

FIG. 5 illustrates a top, exploded view of laser head 2 with upper reflector half 10 removed. In particular, in this view laser head 2 includes, in part, lower reflector half 4, guide posts 6, outer end cap 8, slab 12, inner end cap 14, gasket 16, conventional excitation lamps 112, manifolds 151, plugs 152, manifold tubes 162. Manifolds 151, plugs 152 and tubes 162 will be described in greater detail with respect to. FIGS. 9 and 12.

Head 2 also includes conventional lamp holders 70, O-ring 72, conventional lamp fastener 74, lamp O-ring 76, conventional lamp electrical connection 78, slab seal gasket 84, slab seal retainer 85, conventional fasteners 86, flow screens 87, flow conduits 83, O-ring 89, conduits 90 and 91 and a conventional electrical connector 97. Lamp holders 70, preferably, are constructed of any suitable polymeric material. O-rings 72, 76, 84 and 89, preferably, are constructed of any suitable elastomeric material. Flow screens 87 and conduits 83, preferably, are constructed by any suitable machining techniques. Conduits 90 and 91, preferably, are constructed by any suitable machining techniques.

As can be seen in FIG. 5, when outer end cap 8 contacts slab 12, this connection allows coolant, which, typically, is water to circulate from manifold 151, through conduits 90 and 91 through flow screens 87 through flow conduits 83 around slab 12 and out through flow conduits 83 and flow screen 87, through conduits 90 and 91 and manifold 151. Also, excitation lamps 112 can be electrically connected to a conventional power source (not shown) in order to excite slab 12. Finally, O-rings 16, 72, 76, 84 and 89 should substantially prevent leakage of the coolant from laser head 2.

Figure 6:
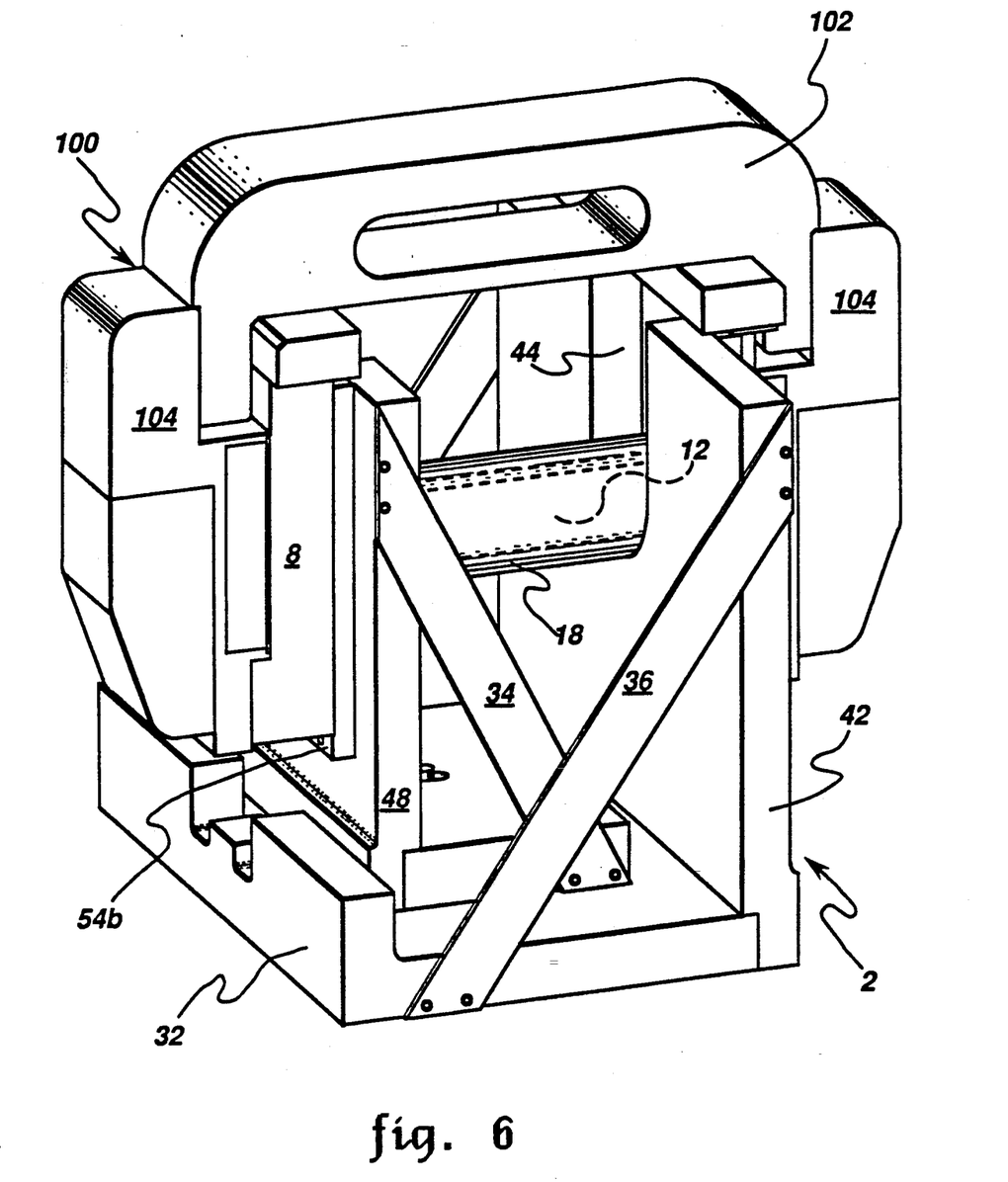
FIG. 6 is an isometric view of the assembly jig with the handle and the compression device in place.
Figure 10:
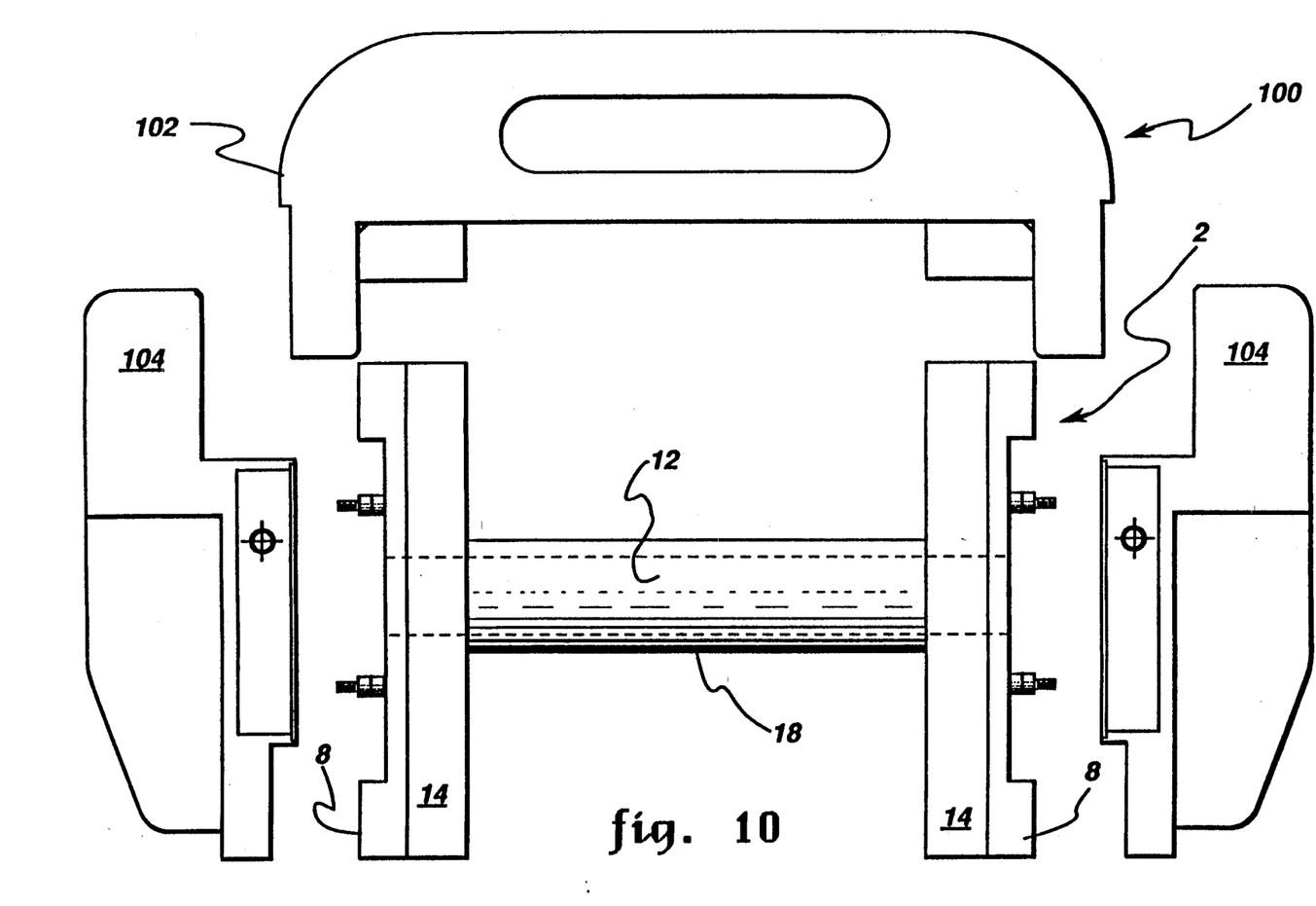
FIG. 10 is an exploded side plan view of the positioning, compression and storage assembly prior to being assembled, according to the present invention.
Figure 11:
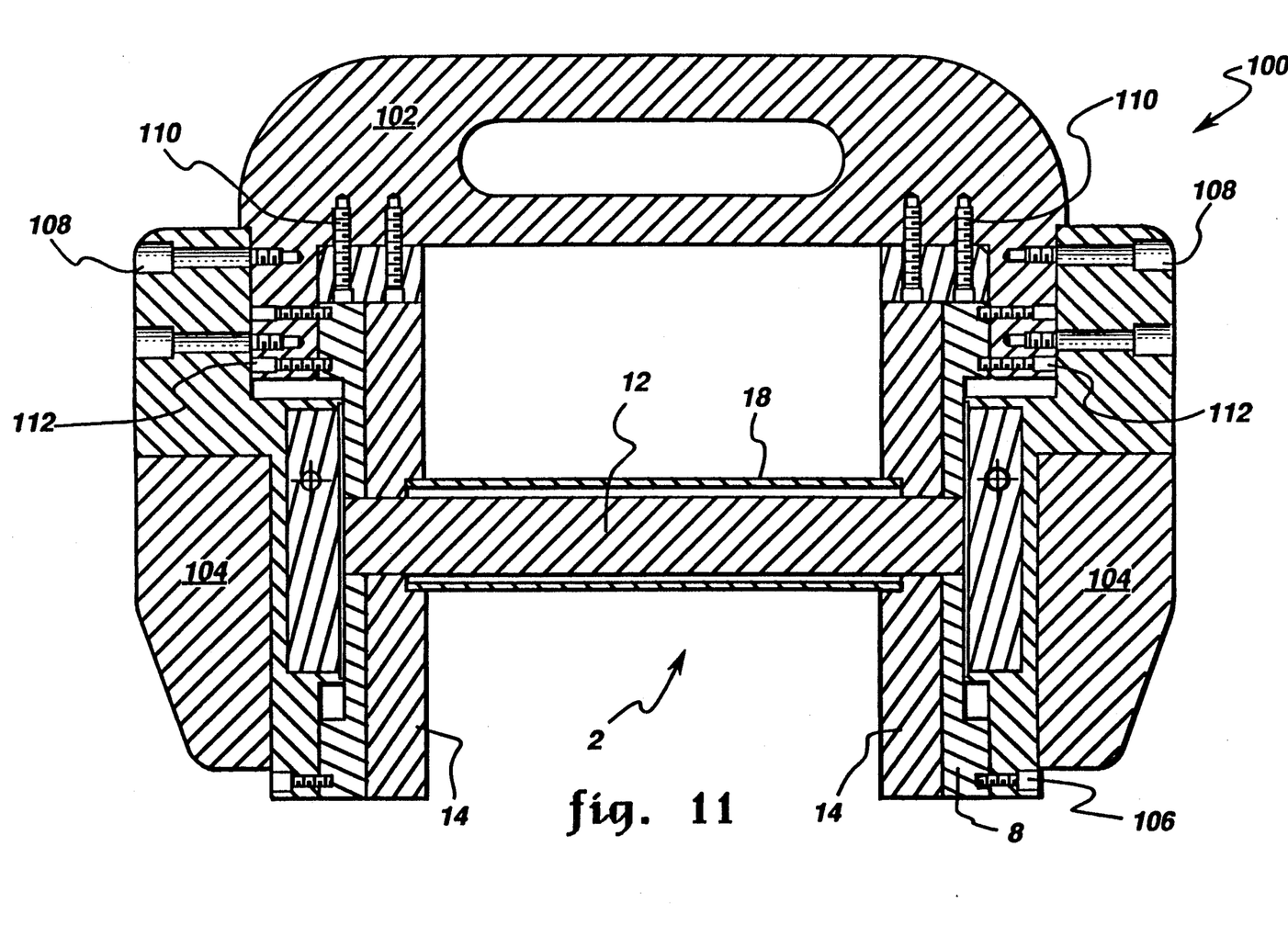
FIG. 11 is a side plan view of an assembled positioning, compression and storage assembly.

With respect to FIG. 6, there is illustrated positioning, compression and storage device 100. Device 100 is rigidly secured to outer end caps 8. In particular, as can be more clearly shown in FIGS. 9 and 10, assembly 100 includes, in part, handle 102 and compression flanges 104. Handle 102 and flanges 104, preferably, are constructed of aluminum. As shown more clearly in FIG. 10, handle 102 is placed over head 2 and rigidly attached to outer end cap 8 by conventional fasteners 112. Handle 102 is also rigidly attached to outer end cap 8 and inner end cap 14 by conventional fasteners 110. Compression flanges 104 are rigidly attached to outer end cap 8 by conventional fasteners 106. Also, flanges 104 are rigidly attached to handle 102 by conventional fasteners 108.

Figure 7:
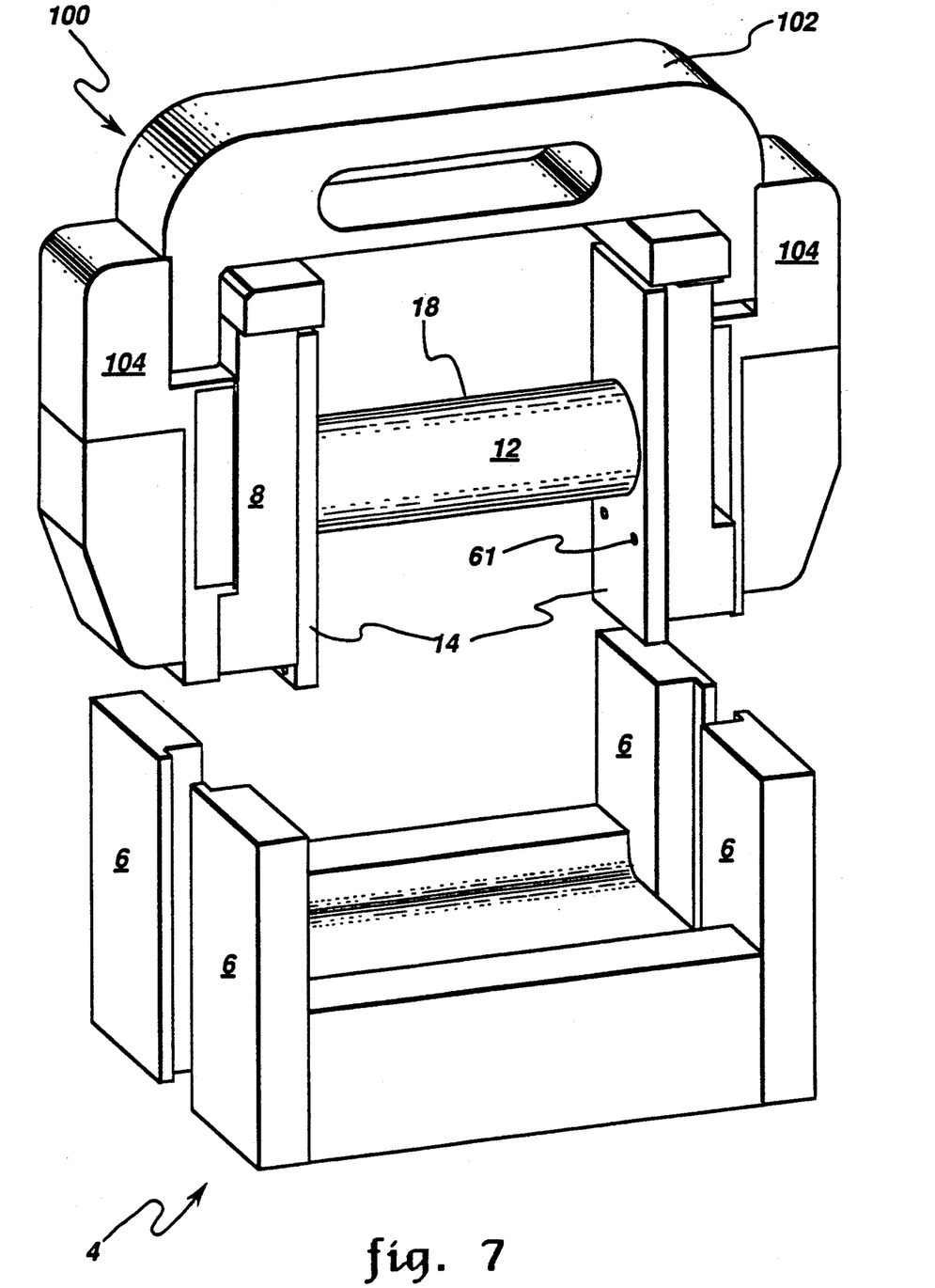
FIG. 7 is an isometric view of the modular slab component prior to insertion into the lower reflector half.

FIG. 7 shows a partially constructed modular face-pumped slab laser head 2. In particular, in this illustration, compression assembly 100 is still attached to outer end caps 8 such that compression assembly 100 can be stored. In this manner, if a defect occurs in slab 12 due to, for example, a contamination or fracture of slab 12, the operator merely has to remove compression assembly 100 from slab laser head 2 and replace the defective compression assembly 100 with a new compression assembly 100. The defective compression assembly 100 can then be repaired. It is to be understood that compression assembly 100 allows outer end caps 8 and 14 to be rigidly held in place while providing proper alignment for slab 12. This allows compression assembly 100 to be placed in a proper storage area so that it can be used later if by chance the compression assembly 100 that is currently being used in the laser head fails.

Figure 8:
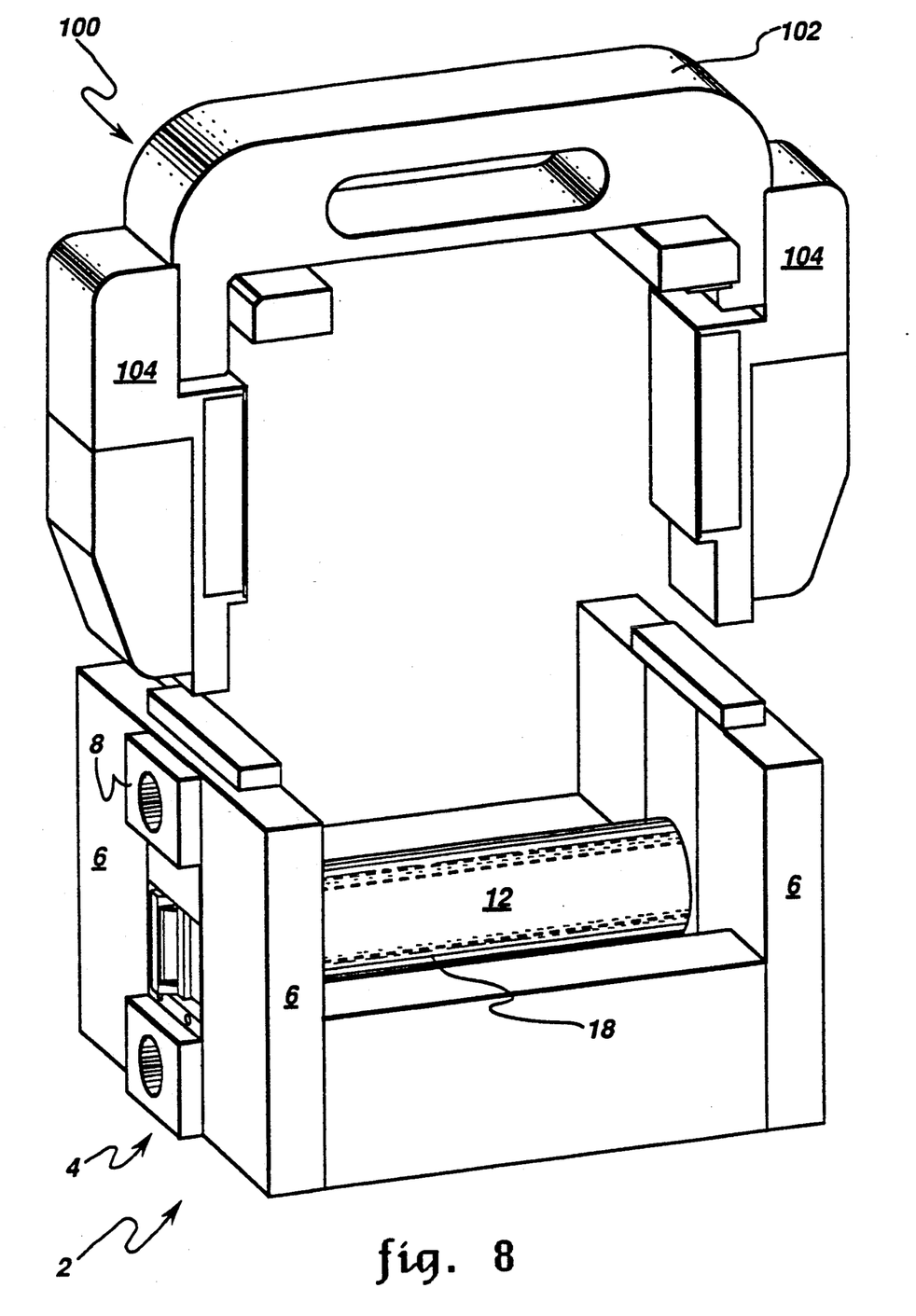
FIG. 8 is an isometric view of the assembled components parts shown in FIG. 1 without the upper reflector half.

With respect to FIG. 8 there is illustrated the insertion of compression assembly 100 into lower reflector half 4. In this illustration, handle 102 and compression flanges 104 have been removed after compression assembly 100 has been placed in lower reflector half 4.

FIG. 9 illustrates the complete assembly of modular face-pumped slab laser head 2 having cooling manifold assembly 150 attached. Also, as can be seen, upper reflector half 110 has been placed on top of lower reflector half 4. Upper reflector half 110, preferably, is constructed in the same manner as lower reflector half 4. Finally, located within laser head 2 are conventional excitation lamps 112 (FIG. 5) which are attached within lower reflector half 4 and upper reflector half 10 and adjacent to slab 12 and tube 18 (FIG. 5) by conventional attachments (not shown).

As can be seen more clearly in FIGS. 9 and 12, self-draining manifold coolant assembly 150 includes, in part, manifold 151, draining caps 152, coolant inlet 154, coolant outlet 156, and conventional fasteners 158 and 160. Manifold 151 and draining caps 152, preferably, are constructed of any suitable coolant water-contamination resistant material such as LEXAN®. Inlet 154, preferably, is constructed of stainless steel.

It is to be understood that the self-draining feature requires that the slab coolant reservoir 164 is mounted lower than the laser head 2 itself so that siphoning does not occur. Note, since both manifolds 151 are identical, that when attached to laser head 2, the self draining plugs 152 face in opposing directions (one up, one down). When it is necessary to drain the slab coolant from laser head 2, removal of these plugs 152 (down facing plug first) quickly drains the coolant into a waiting receptacle (not shown) under the downward facing drain plug. During removal of plugs 152, one plug 152 (the one facing down) acts as a drain while the other plug 152 (the one facing up) acts as a vent. Removal of the manifolds 151 from laser head 2 may now be performed without spillage onto nearby optical components of the laser head 2.

During the operation of manifold assembly 150, coolant, such as, water is fed from a source (not shown) to inlet 154. The coolant traverses manifold tubes 162 to outlet 156. The coolant then enters laser head 2 such that coolant is traversed through tube 18 along slab 12 according to conventional slab cooling techniques.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A modular face-pumped slab laser head, said laser comprised of:
    a lamp means;
    at least two guide means operatively connected to said lamp means;
    a removable modular slab assembly located substantially adjacent to said lamp means and slidably engaging said guide means wherein said modular slab assembly is further comprising a face-pumped laser slab means and a holding means for holding said slab means in a predetermined orientation such that said holding means is further comprised of:
    an inner end cap means; and
    an outer end cap means located substantially adjacent to said inner end cap means; and
    a reflector containment means which substantially encloses said lamp means, said guide means and said removable modular slab assembly.

2. The laser head, as in claim 1, wherein said reflector containment means is further comprised of:
    an upper reflector half; and
    a lower reflector half.

3. The laser head, as in claim 1, wherein said laser slab means is further comprised of:
    a slab;
    a slab tube means located substantially around said slab; and
    a first gasket means located substantially on said slab tube means.

4. The laser head, as in claim 3, wherein said slab is further comprised of:
    an alignment means located at an end of said slab.

5. The laser head, as in claim 1, wherein said outer end cap means is further comprised of an alignment slot means.

6. The laser head, as in claim 1, wherein said laser system is further comprised of:
    a cooling means operatively connected to said laser system.

7. The laser head, as in claim 3, wherein said slab means is further comprised of:
    a second gasket means operatively connected to said slab means; and
    a retainer means located adjacent to said second gasket means.

* * * * *